(12) United States Patent
Yang et al.

(10) Patent No.: US 10,108,820 B2
(45) Date of Patent: Oct. 23, 2018

(54) SNAPSHOT DATA AND HIBERNATION DATA PROCESSING METHODS AND DEVICES

(71) Applicant: MediaTek Inc., Hsin-Chu (TW)

(72) Inventors: Wen-Long Yang, Luodong Township, Yilan County (TW); Jia-Ming Chen, Zhubei (TW); Ming-Yueh Chuang, Hsinchu (TW); Nicholas Ching Hui Tang, Zhudong Township, Hsinchu County (TW); Yu-Ming Lin, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 127 days.

(21) Appl. No.: 14/812,243

(22) Filed: Jul. 29, 2015

(65) Prior Publication Data

US 2016/0210460 A1   Jul. 21, 2016

Related U.S. Application Data

(60) Provisional application No. 62/105,427, filed on Jan. 20, 2015.

(51) Int. Cl.
| | |
|---|---|
| *G06F 12/14* | (2006.01) |
| *G06F 21/78* | (2013.01) |
| *G06F 17/30* | (2006.01) |
| *G06F 12/08* | (2016.01) |

(52) U.S. Cl.
CPC ........ *G06F 21/78* (2013.01); *G06F 17/30088* (2013.01)

(58) Field of Classification Search
CPC ...................................................... G06F 21/78

USPC ......................................................... 713/189
See application file for complete search history.

(56) References Cited

U.S. PATENT DOCUMENTS

| | | | | |
|---|---|---|---|---|
| 2005/0111664 A1* | 5/2005 | Ritz | ...................... | G06F 21/575 380/255 |
| 2006/0053261 A1* | 3/2006 | Prahlad | ................. | G06F 3/0605 711/162 |
| 2006/0126843 A1* | 6/2006 | Brickell | ................ | H04L 9/0637 380/260 |
| 2007/0198851 A1* | 8/2007 | Goto | ...................... | G06F 12/145 713/187 |
| 2011/0296238 A1* | 12/2011 | Abzarian | ................ | G06F 21/72 714/16 |
| 2012/0131320 A1* | 5/2012 | Park | ...................... | G06F 9/4406 713/2 |
| 2013/0054890 A1* | 2/2013 | Desai | .................... | G06F 3/0604 711/114 |

(Continued)

*Primary Examiner* — Haresh N Patel
(74) *Attorney, Agent, or Firm* — McClure, Qualey & Rodack, LLP

(57) ABSTRACT

A method for operating an electronic device, and an electronic device, are provided. In the normal operation state of the electronic device, data which is stored in the main storage device of the electronic device is encrypted by a first encryption algorithm prior to being stored in a non-volatile storage device of the electronic device. The method includes the steps of generating snapshot data in the main storage device when the electronic device is entering a hibernation state, allocating space in the non-volatile storage device for storing the snapshot data, and storing the snapshot data in the space without encrypting the snapshot data using the first encryption algorithm.

20 Claims, 5 Drawing Sheets

(56) References Cited

U.S. PATENT DOCUMENTS

| | | | | |
|---|---|---|---|---|
| 2014/0122803 A1* | 5/2014 | Kato | ...................... | G06F 9/4418 |
| | | | | 711/118 |
| 2014/0137263 A1* | 5/2014 | Yokoyama | .............. | G06F 21/60 |
| | | | | 726/26 |
| 2014/0189198 A1* | 7/2014 | Siddiqi | ............... | G06F 12/0246 |
| | | | | 711/103 |
| 2014/0344222 A1* | 11/2014 | Morris | .............. | G06F 17/30215 |
| | | | | 707/634 |
| 2014/0359224 A1* | 12/2014 | Bisht | .................. | G06F 12/0848 |
| | | | | 711/129 |
| 2015/0052406 A1* | 2/2015 | Garrett | ................ | G06F 11/1448 |
| | | | | 714/45 |
| 2016/0085955 A1* | 3/2016 | Lerner | .................... | G06F 21/31 |
| | | | | 726/20 |

\* cited by examiner

SNAPSHOT DATA AND HIBERNATION DATA PROCESSING METHODS AND DEVICES

CROSS REFERENCE TO RELATED APPLICATIONS

This Application claims priority of U.S. Provisional Patent Application No. 62/105,427, filed on Jan. 20, 2015, the entirety of which is incorporated by reference herein.

BACKGROUND OF THE INVENTION

Field of the Invention

The invention generally relates to the operations of an electronic device, and more particularly to the operations when the electronic device is entering a hibernation state.

Description of the Related Art

Recently, because of the rapid development of communications technology, electronic devices such as smartphones, personal digital assistants, and tablet PCs have become available that are more and more technically advanced and multifunctional. Due to the increased convenience and functionality of such devices, these devices have become necessities of life.

In addition, a hibernation technology is designed to allow the electronic devices to retain user data in non-volatile devices when the electronic devices enter a hibernation state and recover to the original system state by a speedup boot time when the electronic devices are awakened from the hibernation state.

When the electronic devices enter the hibernation state, the electronic devices may store hibernation data in an encrypted non-volatile storage device (i.e. the data stored in the non-volatile storage device needs to be encrypted in advance) to ensure the security and safety of the data. However, the processes of encrypting and decrypting the snapshot data may significantly cause lengthy time to enter the hibernation and lengthy time to recover from the hibernation.

BRIEF SUMMARY OF THE INVENTION

Methods for operating electronic devices in a hibernation state are provided, which can overcome the problems mentioned above.

An embodiment of the invention provides a method for operating an electronic device, wherein in the normal operation state of the electronic device, data which is stored in the main storage device of the electronic device is encrypted by a first encryption algorithm prior to being stored in a non-volatile storage device of the electronic device. The method comprises the steps of generating snapshot data in the main storage device when the electronic device is entering a hibernation state, allocating space in the non-volatile storage device for storing the snapshot data, and storing the snapshot data in the space without encrypting the snapshot data using the first encryption algorithm.

Another embodiment of the invention provides a method for operating an electronic device, wherein the electronic device comprises a main storage device and a non-volatile storage device, and the non-volatile storage device comprises one or more encryption partitions. The method comprises the steps of generating hibernation data in the main storage device when the electronic device is entering a hibernation state, looking for free space within the encryption partitions of the non-volatile storage device for storing the hibernation data, and storing the hibernation data in the free space of the non-volatile storage device without encrypting the hibernation data.

Another embodiment of the invention provides a method for operating an electronic device, wherein the electronic device comprises a main storage device and a non-volatile storage device, and the non-volatile storage device comprises one or more encryption partitions, wherein the encryption partitions store encrypted data obtained by a first encryption algorithm when the electronic device is not in a hibernation state. The method comprises the steps of generating hibernation data in the main storage device when the electronic device is entering the hibernation state, encrypting the hibernation data using a second encryption algorithm that is different from the first encryption algorithm, looking for free space within the encryption partitions of the non-volatile storage device, and storing the encrypted hibernation data in the free space of the non-volatile storage device.

An embodiment of the invention provides an electronic device. The electronic device comprises a main storage device, a non-volatile storage device and a processor. The non-volatile storage device is configured to store the snapshot data in a space without encrypting the snapshot data using the first encryption algorithm, wherein in the normal operation state, data stored in the main storage device is encrypted using the first encryption algorithm prior to being stored in a non-volatile storage device. The processor is configured to generate snapshot data in the main storage device when the electronic device is entering a hibernation state, and allocate space in the non-volatile storage device for storing the snapshot data according to an allocator.

Another embodiment of the invention provides an electronic device. The electronic device comprises a main storage device, a non-volatile storage device and a processor. The non-volatile storage device comprises one or more encryption partitions. The processor is configured to generate hibernation data in the main storage device when the electronic device is entering a hibernation state, looks for free space within the encryption partitions of the non-volatile storage device for storing the hibernation data, and stores the hibernation data in the free space of the non-volatile storage device without encrypting the hibernation data.

Another embodiment of the invention provides an electronic device. The electronic device comprises a main storage device, a non-volatile storage device and a processor. The non-volatile storage device comprises one or more encryption partitions, wherein the encryption partitions store encrypted data obtained by a first encryption algorithm when the electronic device is not in a hibernation state. The processor is configured to generate hibernation data in the main storage device when the electronic device is entering a hibernation state, encrypts the hibernation data using a second encryption algorithm that is different from the first encryption algorithm, looks for free space within the encryption partitions of the non-volatile storage device, and stores the encrypted hibernation data in the free space of the non-volatile storage device.

Another embodiment of the invention provides a method for operating an electronic device, comprising: determining whether to enter a hibernation state; generating snapshot data in the main storage device when the electronic device is entering the hibernation state; allocating a space in one or more encryption partitions of the non-volatile storage device for storing the snapshot data; and storing the snapshot data in the allocated space. The space for storing snapshot data can be respectively allocated for each time of determination to enter the hibernation state without being prepared before it is not determined whether to enter the hibernation state. The snapshot data can be stored in the allocated space in the hibernation state, preferably but not limitedly without being encrypted by an encryption algorithm which is configured for encrypting data to be stored in the one or more encryption partitions of the non-volatile storage device when the electronic device is not in the hibernation mode.

Another embodiment of the invention provides an electronic device, comprising: a main storage device; a non-volatile storage device, comprising one or more encryption partitions; a processor, configured to determine whether to enter a hibernation state, generate snapshot data in the main storage device when the electronic device is entering the hibernation state, allocate a space in one or more encryption partitions of the non-volatile storage device for storing the snapshot data, and store the snapshot data in the allocated space. The space for storing snapshot data can be respectively allocated for each time of determination to enter the hibernation state without being prepared before it is not determined whether to enter the hibernation state. The processor can store the snapshot data in the allocated space in the hibernation state, preferably but not limitedly without encrypting the snapshot data by an encryption algorithm, the encryption algorithm configured for encrypting data to be stored in the one or more encryption partitions of the non-volatile storage device when the electronic device is not in the hibernation mode.

Other aspects and features of the invention will become apparent to those with ordinary skill in the art upon review of the following descriptions of specific embodiments of methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
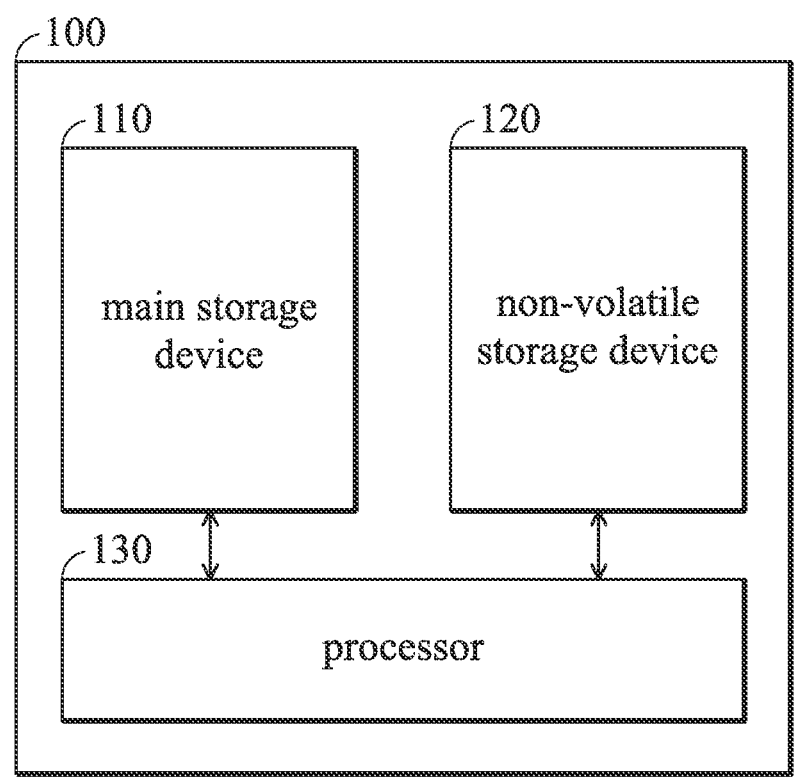
FIG. 1 is a block diagram of an electronic device 100 according to an embodiment of the invention.

FIG. 1 is a block diagram of an electronic device 100 according to an embodiment of the invention. The electronic device 100 comprises a main storage device 110, a non-volatile storage device 120, and a processor 130. FIG. 1 presents a simplified block diagram in which only the elements relevant to the invention are shown. However, the invention should not be limited to what is shown in FIG. 1.

In an embodiment of the invention, the main storage device 110 is a volatile memory, such as Dynamic Random Access Memory (DRAM), and the non-volatile storage device 120 is a non-volatile memory, such as a flash memory, or an Embedded Multi Media Card (eMMC).

In an embodiment of the invention, in the normal operation state of the electronic device 100 (i.e. the electronic device 100 is not in the hibernation state), when the data in the main storage device 110 needs to be stored in the non-volatile storage device 120, the data can be encrypted by a first encryption algorithm before the data is stored in the non-volatile storage device 120. That is to say, in the embodiment of the invention, in normal operation state, the data stored in the non-volatile storage device 120 needs to be encrypted using the first encryption algorithm.

When the electronic device 100 is to shut down and enter a hibernation state, in a method, the processor 130 may generate snapshot data in the main storage device 110, and encrypt the snapshot data using the first encryption algorithm before storing the snapshot data in the non-volatile storage device 120. In addition, the processor 130 may also decrypt the encrypted snapshot data when the electronic device 100 is awakened from the hibernation state. In this method, however, the processes of encrypting and decrypting the snapshot data may significantly cause lengthy time to enter the hibernation and time to recover from the hibernation.

In another method for the hibernation state of the electronic device 100, the snapshot data is not encrypted using the first encryption algorithm before being stored in a non-volatile storage device. To achieve this, the non-volatile storage device 120 can be split to create an unencrypted partition and an encrypted partition, wherein the unencrypted partition is reserved for storing the snapshot data, and it is not accessible when the electronic device 100 is not in the hibernation state. However, the unencrypted partition is a fixed space occupied specific space in the non-volatile storage device 120. That is, when the electronic device 100 is not in the hibernation state, the unencrypted partition of the non-volatile storage device 120 can't be accessed, and only the encrypted partition of the non-volatile storage device 120 is allowed to be used. In contrast, the following embodiments of the invention can provide methods for allocating of memory space more efficiently and flexibly that can overcome these problems.

In an embodiment of the invention, when the electronic device 100 enters a hibernation state (which generally occurs when the electronic device is to shut down), the processor 130 can determine to generate snapshot data in the main storage device 110 and then dynamically allocate space in the non-volatile storage device 120 for storing the snapshot data. In another embodiment, the processor 130 may dynamically allocate space in the non-volatile storage device 120 to prepare the space for storing the snapshot data, before generating the snapshot data. After the allocating of the space, the processor 130 can store snapshot data in the allocated space of the non-volatile storage device 120. After the storing, the processor can shut down the electronic device 100.

Compared to the pre-mentioned methods that create fixed space occupying certain space within the non-volatile storage device, the methods of the embodiments may not need fixed space dedicated for storing the snapshot data. Instead, the methods of the embodiments can dynamically allocate space for storing snapshot data and can therefore use the non-volatile storage more efficiently and flexibly. For example, when the electronic device 100 is not in the hibernation state, a whole space of the non-volatile storage device 120 may be allowed to be used; or there is no space kept for storing snapshot data not permitted to be sued. Moreover, the allocating of space may include determining the size and/or location of the space according to dynamic requirements, as will be described in the following.

When the electronic device 100 is awakened from the hibernation state, the processor 130 can restore the system state according to the snapshot data and then the electronic device 100 can recover the system state. In an embodiment of the invention, in order to decrease the size of the snapshot data, before generating the snapshot data, the processor 130 may have previously cleaned out some data which does not need to be stored in the non-volatile storage device 120.

In an embodiment of the invention, the processor 130 allocates space in the non-volatile storage device 120 for storing the snapshot data using an allocator. In an embodiment of the invention, the allocator may be plugged in to the kernel of the operation system (OS) of the electronic device 100, or in any other forms of software. In another embodiment of the invention, the allocator may be implanted as a circuit or any other forms of hardware.

In an embodiment of the invention, when the processor 130 allocates the space in the non-volatile storage device 120 for storing the snapshot data, the processor 130 may first obtain a predicted size of the snapshot data, and then determine the size of the space according to the predicted size of the snapshot data. For example, the processor 130 can obtain the predicted size of the snapshot data according to a used size of the main storage device 110 and a previous compression ratio. Namely, the processor 130 may predict the size of the snapshot data according the used size of the main storage device 110 and the previous compression ratio. The used size can be decreased by cleaning out data not required to be stored in the hibernation state. In an embodiment of the invention, when the real requested size of the snapshot data exceeds the predicted size corresponding to the snapshot data, the processor 130 can re-determine the size of the space which is allocated to store the snapshot data according to the used size of the main storage device 110 and the current compression ratio. In this way, the size of space within the non-volatile storage device 120 for storing the snapshot data may not fixed, and may be varied in different hibernation processes.

In an embodiment of the invention, when the processor 130 allocates the space in the non-volatile storage device 120 for storing the snapshot data, the processor 130 may look for or search for free space (currently not being used) within the non-volatile storage device 120. It is noted that the free space can be one or more blocks of memory units and/or scattered memory units, which can all be collectively or singly employed to store the snapshot data. In this way, the location of space within the non-volatile storage device 120 for storing the snapshot data may not fixed, and may be varied in different hibernation processes.

In some embodiments of the invention, before the snapshot data is stored in the allocated space of the non-volatile storage device 120, the snapshot data doesn't need to be encrypted by the first encryption algorithm. This is in contrast to the prementioned method that the snapshot data has to be encrypted.

In an embodiment of the invention, before the snapshot data is stored in the allocated space of the non-volatile storage device 120, the snapshot data doesn't need to be encrypted by any encryption algorithm (including the first encryption algorithm). That is to say, when the electronic device 100 is in the hibernation state and the snapshot data in the main storage device 110 needs to be stored in the non-volatile storage device 120, the snapshot data may not be encrypted by any encryption algorithm before the snapshot data is stored in the non-volatile storage device 120.

In another embodiment of the invention, before the snapshot data is stored in the allocated space of the non-volatile storage device 120, the processor 130 can encrypt the snapshot data using a second encryption algorithm which is appropriate for encrypting the snapshot data. The second encryption algorithm is different from the first encryption algorithm. In an embodiment of the invention, the second encryption algorithm can be faster than the first encryption algorithm, more suitable for encrypting snapshot data, and capable of grantee data safety and high performance. Therefore, when the electronic device 100 is awakened from the hibernation state, the encrypted snapshot data can be decrypted using a decryption algorithm corresponding to the second encryption algorithm.

In an embodiment of the invention, the processor 130 may compress the snapshot data, before storing the snapshot data in the non-volatile storage device 120. In addition, the processor 130 may decompress the snapshot data, when the electronic device 100 is awakened from the hibernation state.

Figure 2:
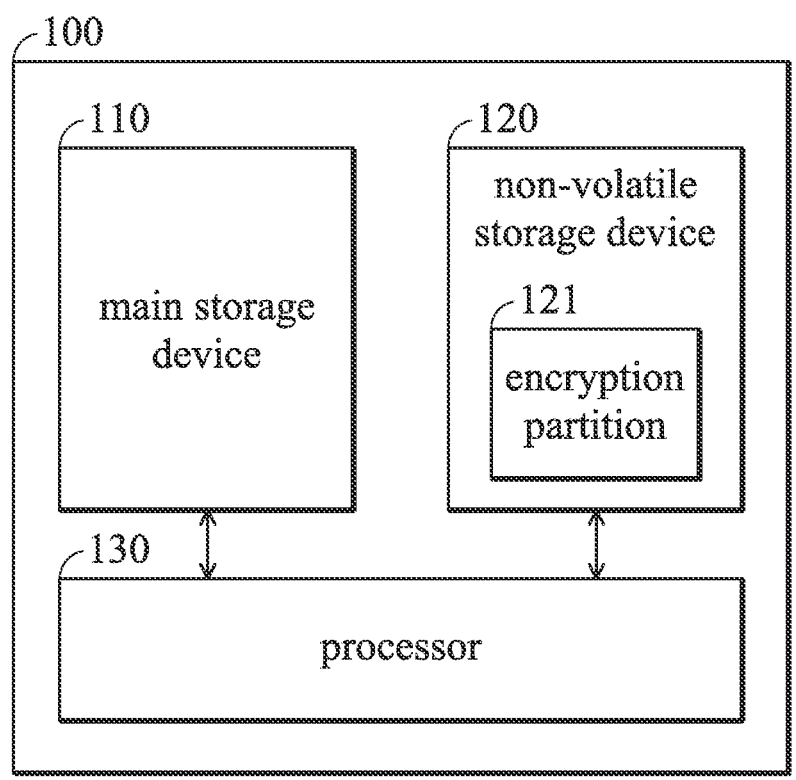
FIG. 2 is a block diagram of an electronic device 100 according to another embodiment of the invention.

FIG. 2 is a block diagram of an electronic device 100 according to another embodiment of the invention. As shown in FIG. 2, in the embodiment of the invention, the non-volatile storage device 120 may comprise one or more encryption partitions 121. In an embodiment of the invention, the encryption partitions can be configured to store data which is encrypted using the first encryption algorithm when the electronic device 100 is not in the hibernation state (e.g. the electronic device 100 is in normal operation state). FIG. 2 presents a simplified block diagram in which only the elements relevant to the invention are shown. However, the invention should not be limited to what is shown in FIG. 2. In addition, FIG. 2 only presents one encryption partition 121, but the invention should not be limited thereto. The non-volatile storage device 120 may comprise more encryption partitions 121.

As shown in FIG. 2, in the embodiment of the invention, when the electronic device 100 is to shut down and enter the hibernation state, after the processor 130 generates the snapshot data in the main storage device 110, the processor 130 can look for free space within the encryption partitions 121 of the non-volatile storage device 120 for storing the snapshot data. In an embodiment of the invention, the processor 130 may determine the size of the free space within the encryption partitions 121 in the non-volatile storage device 120 device for storing the hibernation data before the hibernation data is generated. The processor 130 determines the size of the free space according to the size of the snapshot data. In the embodiment of the invention, the processor 130 may store the snapshot data in the free space of the non-volatile storage device without encrypting the snapshot data. In an embodiment of the invention, after the processor 130 generates the snapshot data in the main storage device 110, the processor 130 may encrypt the snapshot data using the second encryption algorithm which is different from the first encryption algorithm.

In is noted that the terms "hibernation data" and "snapshot data" can have the same or different meanings. That is, hibernation data may not be limited to snapshot data, any specific type/format of data, or any data produced by any specific process. The term "hibernation data" can mean any data before or after compression operation or other operation/data rearranging processes prepared to enter the hibernation. Moreover, the term "snapshot data" can include part or whole of data arranged to be stored in the non-volatile storage device from the main memory. Similarly, the term "hibernation data" can include part or whole of the snapshot data. Furthermore, it is also noted that the allocator for hibernation or recovery processes can support either or both of file-level accesses and block-level accesses for the non-volatile storage device.

Figure 3:
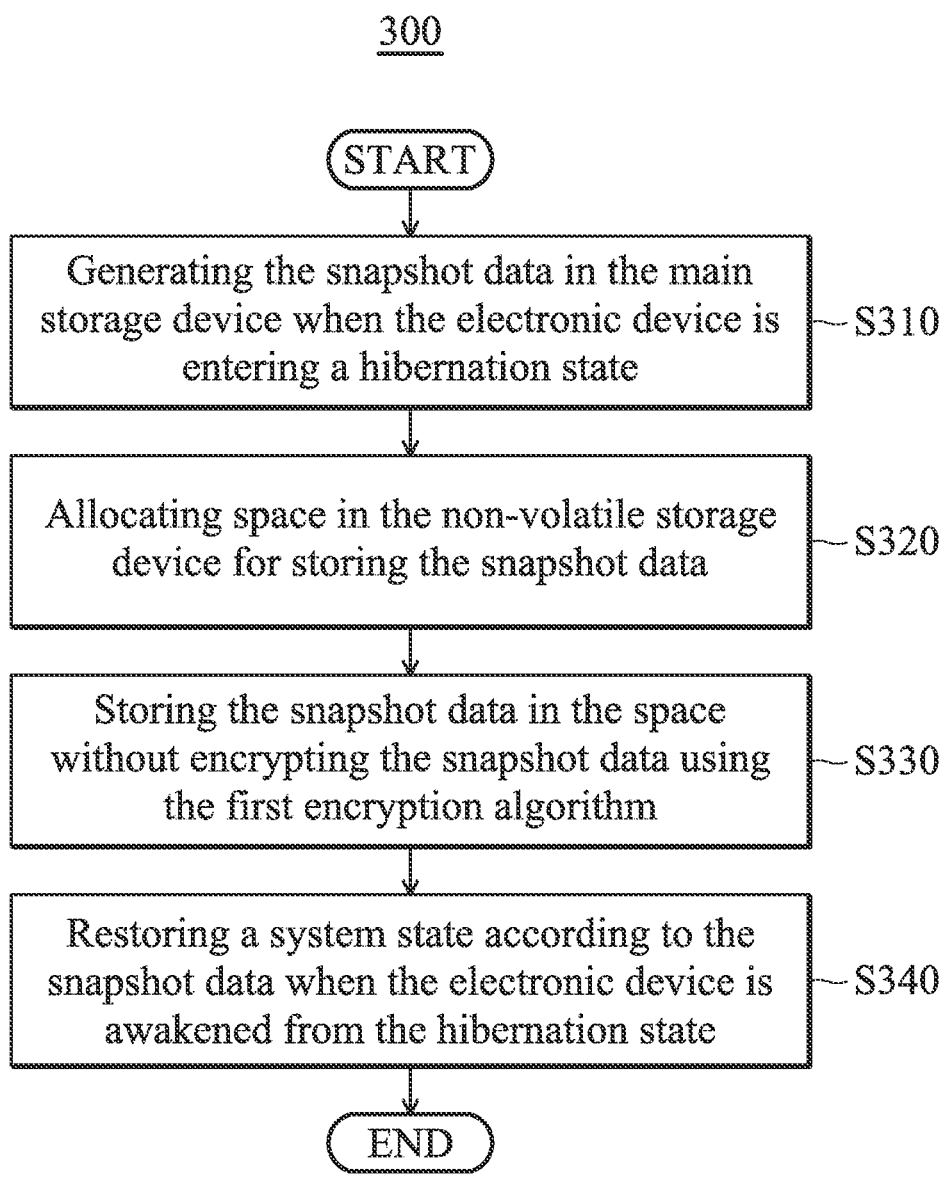
FIG. 3 is a flow chart illustrating the method 300 for operating an electronic device according to an embodiment of the invention.

FIG. 3 is a flow chart illustrating the method 300 for operating an electronic device according to an embodiment of the invention. The method 300 can be applied to the electronic device 100. First, in step S310, the electronic device 100 generates the snapshot data in the main storage device 110 when the electronic device 100 is entering a hibernation state. In step S320, the electronic device 100 allocates space in the non-volatile storage device 120 for storing the snapshot data. In step S330, the electronic device 100 stores the snapshot data in the space without encrypting the snapshot data using the first encryption algorithm. In step S340, the electronic device 100 restores a system state according to the snapshot data when the electronic device 100 is awakened from the hibernation state. In an embodiment of the invention, step S320 may be performed before step S310.

In an embodiment of the invention, step S330 may comprise the steps of obtaining a predicted size of the snapshot data, and determining the size of the space according to the predicted size of the snapshot data. In the embodiment of the invention, the electronic device 100 obtains the predicted size of the snapshot data according to the used size of the main storage device 110 and a previous compression ratio. In the embodiment of the invention, when the required size of the snapshot data exceeds the predicted size of the snapshot data, the electronic device 100 may redetermine the size of the space in the non-volatile storage device 120.

In an embodiment of the invention, step S330 further includes the step of looking for free space in the non-volatile storage device 120 for storing the snapshot data.

In an embodiment of the invention, the snapshot data is stored in the space of the non-volatile storage device 120 without being encrypted by any encryption algorithm. In another embodiment of the invention, the snapshot data is encrypted and decrypted using a second encryption algorithm. In an embodiment of the invention, the method further includes the steps of compressing the snapshot data, before storing the snapshot data in the non-volatile storage device 120, and decompressing the snapshot data, when the electronic device 100 is awakened from the hibernation state.

Figure 4:
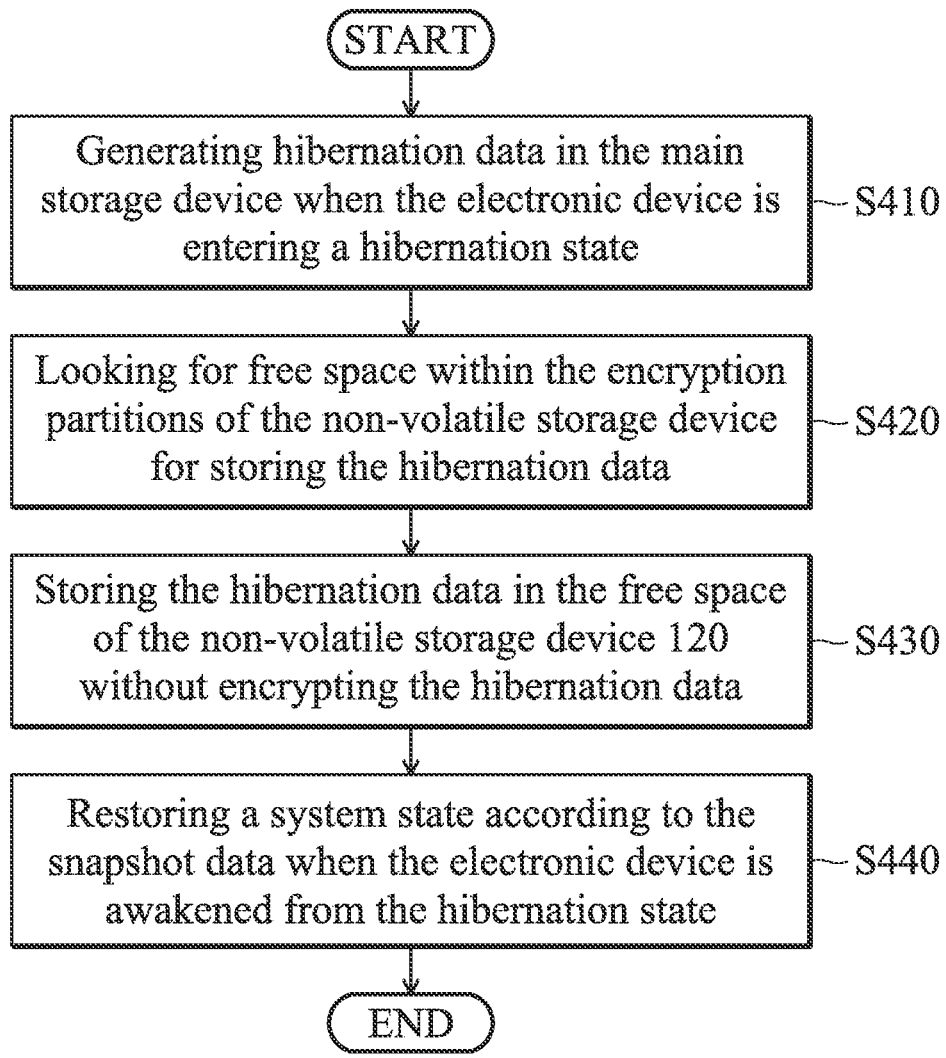
FIG. 4 is a flow chart illustrating the method 400 for operating an electronic device according to another embodiment of the invention.

FIG. 4 is a flow chart illustrating the method 400 for operating an electronic device according to another embodiment of the invention. The method 400 can be applied to the electronic device 100. In the method 400, the non-volatile storage device 120 of the electronic device 100 comprises one or more encryption partitions. In step S410, the electronic device 100 generates hibernation data in the main storage device 110 when the electronic device 100 is entering a hibernation state. In step S420, the electronic device 100 looks for free space within the encryption partitions of the non-volatile storage device 120 for storing the hibernation data. In step S430, the electronic device 100 can preferably (but not limitedly) store the hibernation data in the free space of the non-volatile storage device 120 without encrypting the hibernation data. In step S440, the electronic device 100 restores a system state according to the snapshot data when the electronic device 100 is awakened from the hibernation state.

In the embodiment of the invention, the method 400 can further comprise the step of determining the size of the free space in the non-volatile storage device by the electronic device 100 for storing the hibernation data before the hibernation data is generated. In the embodiment of the invention, the electronic device 100 can determine the size of the free space according to the size of the hibernation data.

Figure 5:
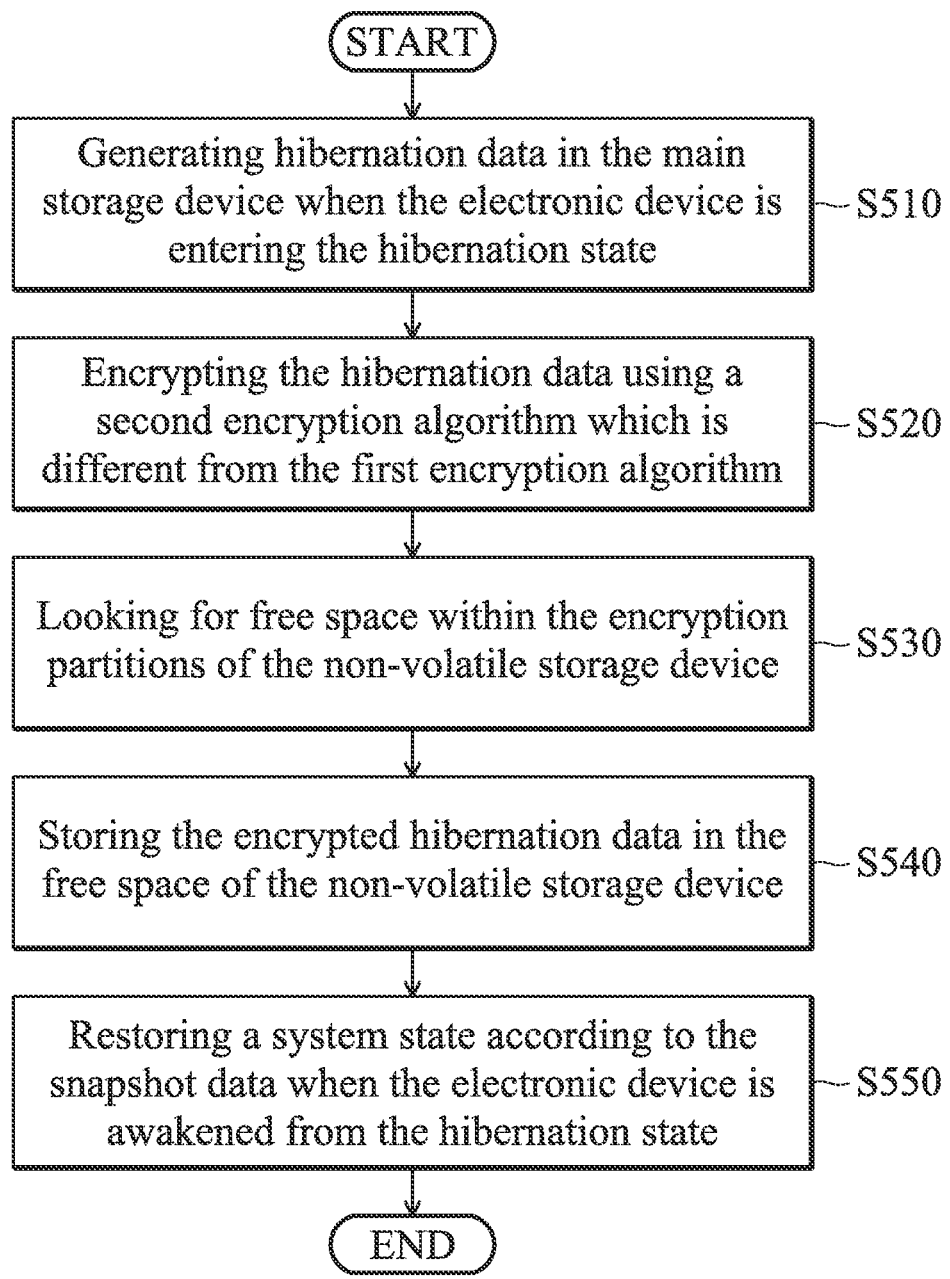
FIG. 5 is a flow chart illustrating the method 500 for operating an electronic device according to another embodiment of the invention.

FIG. 5 is a flow chart illustrating the method 500 for operating an electronic device according to another embodiment of the invention. The method 500 can be applied to the electronic device 100. In the method 500, the non-volatile storage device 120 of the electronic device 100 comprises one or more encryption partitions, wherein the encryption partitions store the encrypted data obtained by a first encryption algorithm when the electronic device 100 is not in a hibernation state. In step S510, the electronic device 100 generates hibernation data in the main storage device 110 when the electronic device 100 is entering the hibernation state. In step S520, the electronic device 100 encrypts the hibernation data using a second encryption algorithm which is different from the first encryption algorithm. In step S530, the electronic device 100 looks for free space within the encryption partitions of the non-volatile storage device 120. In step S540, the electronic device 100 stores the encrypted hibernation data in the free space of the non-volatile storage device 120. In step S550, the electronic device 100 restores a system state according to the snapshot data when the electronic device 100 is awakened from the hibernation state.

In the embodiment of the invention, the method 500 can further comprise the step of the electronic device 100 determining the size of the free space in the non-volatile storage device for storing the hibernation data before the hibernation data is generated. In the embodiment of the invention, the electronic device 100 can determine the size of the free space according to the size of the hibernation data.

Another embodiment of the invention also provides a method for operating an electronic device, comprising: determining whether to enter a hibernation state; generating snapshot data in the main storage device when the electronic device is entering the hibernation state; allocating a space in one or more encryption partitions of the non-volatile storage device for storing the snapshot data; and storing the snapshot data in the allocated space. The space for storing snapshot data can be respectively allocated for each time of determination to enter the hibernation state without being prepared before it is not determined whether to enter the hibernation state. The snapshot data can be stored in the allocated space in the hibernation state, preferably but not limitedly without being encrypted by an encryption algorithm which is configured for encrypting data to be stored in the one or more encryption partitions of the non-volatile storage device when the electronic device is not in the hibernation mode. Similarly, an electronic device including a main storage device, a non-volatile storage device having one or more encryption partitions, and a processor capable of performing the method can be also implemented in another embodiment. Details can be analogized by the descriptions of the method and are omitted here for brevity.

In the methods of the embodiments of the invention, in a hibernation state of a electronic device, the hibernation data (or the snapshot data) which needs to be stored in an encrypted storage device (e.g. non-volatile storage device 120) may not be encrypted by an encryption algorithm employed in a normal state of the electronic device. In addition, the electronic device may dynamically allocate the space of the encrypted storage device for storing the hibernation data (snapshot data), for example, by dynamically determining the location and/or size of the space within the encrypted storage device for storing the hibernation data (snapshot data). Consequently, the storage space of the encrypted storage device can be allocated efficiently and flexibly. Furthermore, in some embodiments, the electronic device does not encrypt the hibernation data (snapshot data) by any encryption algorithm. In some other embodiments, the electronic device can encrypt the hibernation data (snapshot data) using a faster encryption algorithm different from the encryption algorithm employed in a normal state of the electronic device to increase the safety. Therefore, the advantages of hibernation and/or encryption can be retained without wasting non-volatile storage space. Consequently, a balance between security and usability can be achieved.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A snapshot data processing method, applied to an electronic device, the method comprising:
    obtaining, by a processor, a predicted size of snapshot data according to a used size of a main storage device of the electronic device and a previous compression ratio;
    determining, by the processor, a size of a space according to the predicted size of the snapshot data;
    generating, by the processor, the snapshot data in the main storage device of the electronic device when the electronic device is entering a hibernation state;
    allocating, by an allocator, a space in a non-volatile storage device of the electronic device for storing the snapshot data;
    storing the snapshot data in the space of the non-volatile storage device directly without encrypting the snapshot data using the first encryption algorithm;
    enciphering, by the processor, other data which is needed to be stored in the non-volatile storage by the first encryption algorithm; and
    restoring, by the processor, a system state according to the snapshot data when the electronic device is awakened from the hibernation state.

2. The snapshot data processing method of claim 1, wherein the step of allocating the space in the non-volatile storage device for storing the snapshot data is performed before the snapshot data is generated.

3. The snapshot data processing method of claim 1, wherein the step of allocating the space in the non-volatile storage device for storing the snapshot data further comprises:
    in an event where a required size of the snapshot data exceeds the predicted size of the snapshot data, redetermining the size of the space in the non-volatile storage device.

4. The snapshot data processing method of claim 3, wherein the step of redetermining the size of the space in the non-volatile storage device is performed according to the used size of the main storage device and a current compression ratio.

5. The snapshot data processing method of claim 1, wherein the step of allocating the space in the non-volatile storage device for storing the snapshot data comprises looking for free space in the non-volatile storage device for storing the snapshot data.

6. The snapshot data processing method of claim 1, wherein the snapshot data is stored in the space of the non-volatile storage device without being encrypted by any encryption algorithm.

7. The snapshot data processing method of claim 1, further comprising:
    encrypting the snapshot data using a second encryption algorithm that is different from the first encryption algorithm, before storing the snapshot data in the space of the non-volatile storage device.

8. The snapshot data processing method of claim 7, further comprising:
    decrypting the snapshot data using a decryption algorithm corresponding to the second encryption algorithm, when the electronic device is awakened from the hibernation state.

9. The snapshot data processing method of claim 1, further comprising:
    compressing the snapshot data, before storing the snapshot data in the non-volatile storage device.

10. The snapshot data processing method of claim 9, further comprising:
    decompressing the snapshot data, when the electronic device is awakened from the hibernation state.

11. A hibernation data processing device, comprising:
    an allocator;
    a main storage device;

a non-volatile storage device, when the hibernation data processing device is entering a hibernation state, configured to store the snapshot data in a space of the non-volatile storage device directly, wherein the snapshot data is not encrypted using a first encryption algorithm; and a processor, when the hibernation data processing device is entering the hibernation state, configured to generate snapshot data in the main storage device, use the allocator to allocate space in the non-volatile storage device for storing the snapshot data, and encipher other data which is needed to be stored in the non-volatile storage by the first encryption algorithm, wherein the processor allocates the space in the non-volatile storage device for storing the snapshot data by obtaining a predicted size of the snapshot data according to a used size of the main storage device and a previous compression ratio and determining a size of the space according to the predicted size of the snapshot data, wherein the processor restores a system state according to the snapshot data when the electronic device is awakened from the hibernation state.

12. The hibernation processing device of claim 11, wherein the processor allocates the space in the non-volatile storage device for storing the snapshot data before the snapshot data is generated.

13. The hibernation data processing device of claim 11, wherein the processor allocates the space in the non-volatile storage device for storing the snapshot data further comprises the step of redetermining the size of the space in the non-volatile storage device, in an event where a required size of the snapshot data exceeds the predicted size of the snapshot data.

14. The hibernation data processing device of claim 13, wherein the processor redetermines the size of the space in the non-volatile storage device according to the used size of the main storage device and a current compression ratio.

15. The hibernation data processing device of claim 11, wherein the processor allocates the space in the non-volatile storage device for storing the snapshot data by looking for free space in the non-volatile storage device for storing the snapshot data.

16. The hibernation data processing device of claim 11, wherein the snapshot data is stored in the space of the non-volatile storage device without being encrypted by any encryption algorithm.

17. The hibernation data processing device of claim 11, wherein the processor further encrypts the snapshot data using a second encryption algorithm that is different from the first encryption algorithm, before storing the snapshot data in the space of the non-volatile storage device.

18. The hibernation data processing device of claim 17, wherein the processor further decrypts the snapshot data, when the electronic device is awakened from the hibernation state.

19. The hibernation data processing device of claim 11, wherein the processor further compresses the snapshot data, before storing the snapshot data in the non-volatile storage device.

20. The hibernation data processing device of claim 19, wherein the processor further decompresses the snapshot data, when the electronic device is awakened from the hibernation state.

* * * * *